US012628897B2

(12) United States Patent
Duma et al.

(10) Patent No.: US 12,628,897 B2
(45) Date of Patent: May 19, 2026

(54) EQUESTRIAN HELMET STAR SYSTEM

(71) Applicant: VIRGINIA TECH INTELLECTUAL PROPERTIES, INC., Blacksburg, VA (US)

(72) Inventors: Lauren Duma, Blacksburg, VA (US); Barry Miller, Blacksburg, VA (US); Mark Begonia, Christiansburg, VA (US); Steve Rowson, Blacksbur, VA (US); Stefan Duma, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 405 days.

(21) Appl. No.: 18/363,293

(22) Filed: Aug. 1, 2023

(65) Prior Publication Data

US 2024/0032637 A1 Feb. 1, 2024

Related U.S. Application Data

(60) Provisional application No. 63/370,019, filed on Aug. 1, 2022.

(51) Int. Cl.
*G01P 15/00* (2006.01)
*A42B 3/06* (2006.01)

(52) U.S. Cl.
CPC .............. *A42B 3/067* (2013.01); *G01P 15/00* (2013.01)

(58) Field of Classification Search
CPC ...... A42B 3/067; G01P 15/00; G01P 15/0891
See application file for complete search history.

(56) References Cited

U.S. PATENT DOCUMENTS 3,331,236 A * 7/1967 Payne .................. G01N 29/045
73/12.04
3,882,547 A 5/1975 Morgan
(Continued)

OTHER PUBLICATIONS

Bailey, A. M., McMurry, T. L., Cormier, J.M., Funk, J.R., Crandall, J.R., Mack, C.D., Myers, B.S., & Arbogast, K.B. (2020). Comparison of laboratory and On-field performance of American football helmets. Annals of Biomedical Engineering, 48(11), 2531-2541. doi:10.1007/s10439-020-02627-5.
(Continued)

*Primary Examiner* — Xin Y Zhong
(74) *Attorney, Agent, or Firm* — Perilla Knox & Hildebrandt LLP; James J. Rha

(57) ABSTRACT

Various embodiments relating to methods for evaluating injury mitigation performance of helmets that are used for sports (e.g., equestrian sports) are described. In one embodiment, a method for evaluating injury mitigation performance of an equestrian helmet includes applying a first impact configuration to a first and a second helmet of the same model and applying a second impact configuration to a third and a fourth helmet that are both of the same model as the first and the second helmet. The method further includes generating acceleration data based on impacts that occur as part of the first impact configuration and the second impact configuration. The method further includes determining concussion risk values based on the generated acceleration data. The method also includes determining a concussion risk metric based on the concussion risk values and exposure values.

20 Claims, 7 Drawing Sheets

(56) References Cited

U.S. PATENT DOCUMENTS

| 4,239,106 | A | 12/1980 | Aileo |
| 4,290,149 | A | 9/1981 | Aileo |
| 5,575,017 | A | 11/1996 | Hefling et al. |
| 5,922,937 | A | 7/1999 | Kowalski et al. |
| 6,871,525 | B2* | 3/2005 | Withnall ................... G01N 3/32 |
| | | | 73/12.14 |
| 9,797,821 | B2* | 10/2017 | Duma ...................... G01M 7/08 |
| 10,837,887 | B2* | 11/2020 | Brandt ................... G01N 3/307 |
| 10,869,520 | B1 | 12/2020 | Leon |
| 12,025,538 | B2* | 7/2024 | Duma ...................... G01M 7/08 |
| 2004/0074283 | A1 | 4/2004 | Withnall et al. |
| 2004/0226077 | A1 | 11/2004 | Toth |
| 2006/0059605 | A1 | 3/2006 | Ferrara |
| 2007/0209098 | A1 | 9/2007 | Peart |
| 2008/0256685 | A1 | 10/2008 | Lampe et al. |
| 2011/0296594 | A1 | 12/2011 | Thomas et al. |
| 2012/0036620 | A1 | 2/2012 | Harris |
| 2012/0247178 | A1 | 10/2012 | Kis, Jr. et al. |
| 2013/0061375 | A1 | 3/2013 | Bologna et al. |
| 2013/0086733 | A1 | 4/2013 | Szalkowski et al. |
| 2013/0174329 | A1 | 7/2013 | Hanson et al. |
| 2014/0325745 | A1 | 11/2014 | Erb et al. |
| 2015/0040685 | A1 | 2/2015 | Nicholson et al. |
| 2015/0046116 | A1 | 2/2015 | Eatwell |
| 2015/0128332 | A1 | 5/2015 | Jinkins |
| 2015/0237945 | A1 | 8/2015 | Vito et al. |
| 2015/0369694 | A1 | 12/2015 | Neale et al. |
| 2016/0021964 | A1 | 1/2016 | Duma et al. |
| 2016/0290881 | A1 | 10/2016 | Sicking |
| 2017/0280814 | A1 | 10/2017 | Tuttle et al. |
| 2017/0303624 | A1 | 10/2017 | Vito |
| 2018/0021661 | A1 | 1/2018 | Bologna et al. |
| 2018/0172551 | A1 | 6/2018 | Pradeep |
| 2018/0271202 | A1 | 9/2018 | Wiart et al. |
| 2019/0086309 | A1 | 3/2019 | Brandt et al. |
| 2019/0216159 | A1 | 7/2019 | Vanhoutin et al. |
| 2020/0215415 | A1 | 7/2020 | Bologna et al. |
| 2020/0225133 | A1* | 7/2020 | Petel ................... G01T 1/20186 |
| 2021/0048359 | A1 | 2/2021 | Trexler et al. |
| 2021/0270686 | A1 | 9/2021 | Rogers et al. |
| 2023/0045678 | A1 | 2/2023 | Duma |
| 2023/0232915 | A1 | 7/2023 | Larson et al. |
| 2023/0263255 | A1 | 8/2023 | Rowson et al. |
| 2023/0263256 | A1 | 8/2023 | Rowson et al. |
| 2023/0389641 | A1 | 12/2023 | Duma et al. |
| 2024/0032637 | A1 | 2/2024 | Duma et al. |

OTHER PUBLICATIONS

Bland, M. L., McNally, C., Zuby, D. S., Mueller, B. C., & Rowson, S. (2019). Development of the star evaluation system for assessing bicycle helmet protective performance. Annals of Biomedical Engineering, 48(1), 47-57. doi:10.1007/s10439-019-02330-0.

Bland, M.L., McNally, C., and Rowson, S. Headform and Neck Effects on Dynamic Response in Bicycle Helmet Oblique Impact Testing. Proceedings of IRCOBI Conference, 2018. Athens, Greece.

Campolettano, E. T., Gellner, R. A., Sproule, D. W., Begonia, M. T., & Rowson, S. (2020). Quantifying youth football helmet performance: Assessing linear and rotational head acceleration. Annals of Biomedical Engineering, 48(6), 1640-1650. doi:10.1007/s10439-020-02505-0.

Cobb, B.R., Tyson, A.M., and Rowson, S. Head acceleration measurement techniques: Reliability of angular rate sensor data in helmeted impact testing. Proceedings of the Institution of Mechanical Engineers, Part P: Journal of Sports Engineering and Technology, 2017. p. 1-6.

EN 1385: 2012 (2013) Helmets for canoeing and whitewater sports. BSI Standards Publication. Whitewater Photography. [Digital image]. Retrieved from https://adventuresonthegorge.com/.

Hardy, W.N., Mason, M.J., Foster, C.D., et al. A study of the response of the human cadaver head to impact. Stapp Car Crash Journal, 2007. 51:17-80.

Hershman, L.L., (2001). The U.S. new car assessment program (NCAP): past, present and future. International Technical Conference on Enhanced Safety of Vehicles, Paper No. 2001-06-0245.

International ASTM. Standard specifications for helmets used for recreational snow sports. ASTM International: F2040-18 2019.

Ji, S., Zhao, W., Li, Z., McAllister, T.W. Head impact accelreations for brain strain-related responses in contact sports: a model-based investigation. Biomech Model Mechanobiol, 2014. 13(5): 1121-36.

Kleiven, S. Predictors for Traumatic Brain Injuries Evaluated through Accident Reconstructions. Stapp Car Crash Journal, 2007. 51: p. 81-114.

Ommaya, A.K. Biomechanics of Head Injuries: Experimental Aspects. Biomechanics of Trauma, A. Nahum, J. W. Melvin, Ed. Eat Norwalk, CT: Appleton-Century-Crofts, 1985.

Pellman et al.; Concussion in Professional Football: Helmet Testing to Assess Impact Performance—Part 11; Jan. 2006, Neurosurgery, 58(1), 78-96, doi:10.1227/01.neu.0000196265.35238.7c.

Post, A., Oeur, A., Hoshizaki, B., & Gilchrist, M. D. (2013). Examination of the relationship between peak linear and angular accelerations to brain deformation metrics in hockey helmet impacts. Computer Methods in Biomechanics and Biomedical Engineering, 16(5), 511-519. doi:10.1080/10255842.2011.627559.

Rousseau, P., Hoshizaki, T.B., and Gilchrist, M.D. Estimating the influence of neckform compliance on brain tissue strain during a helmeted impact. Stapp Car Crash Journal, 2010. 54: p. 37-48.

Rowson, B., Rowson, S., & Duma, S. M. (2015). Hockey star: A methodology for assessing the biomechanical performance of hockey helmets. Annals of Biomedical Engineering, 43(10), 2429-2443. doi: 10.1007/s10439-015-1278-7.

Rowson, S., & Duma, S. M. (2011). Development of the star evaluation system for football helmets: Integrating player head impact exposure and risk of concussion. Annals of Biomedical Engineering, 39(8), 2130-2140. doi:10.1007/s10439-011-0322-5.

Rowson, S., & Duma, S. M. (2013). Brain injury prediction: Assessing the combined probability of concussion using linear and rotational head acceleration. Annals of Biomedical Engineering, 41(5), 873-882. doi:10.1007/s10439-012-0731-0.

Rowson, S., Duma, S. M., Greenwald, R. M., Beckwith, J. G., Chu, J. J., Guskiewicz, K. M., Mihalik, J.P., Crisco, J.J., Wilcox, B.J., McAllister, T.W., Maerlender, A.C., Broglio, S.P., Schnebel, B., Anderson, S., & Brolinson, P. G. (2014). Can helmet design reduce the risk of concussion in football? Journal of Neurosurgery, 120(4), 919-922. doi:10.3171/2014.1.jns13916.

Rowson, S., Duma, S.M., et al. Rotational head kinematics in football impacts: an injury risk function for concussion. Annals of Biomedical Engineering, 2012. 40(1): p. 1-13.

Schoen, R. G., & Stano, M. J. (2002). Year 2000 Whitewater Injury Survey. Wilderness & Environmental Medicine, 13 (2), 119-124. doi:10.1580/1080-6032(2002)013[0119:ywis]2.0.co;2.

Solomito, M.J., Reuman, H., Wang, D.H. (2019). Sex differences in concussion: a review of brain anatomy, function, and biomechanical response to impact. Brain Injury, 33(2), 105-110. doi.org/10.1080/02699052.2018.1542507.

Spittler, J., Gillum, R., & DeSanto, K. (2020). Common injuries in whitewater rafting, kayaking, canoeing, and stand-up paddle boarding. Current Sports Medicine Reports, 19(10), 422-429. doi:10.1249/jsr.0000000000000763.

Steenstrup S.E., Mok K.M., McIntosh A.S., Bahr R., Krosshaug T. Head impact velocities in FIS World Cup snowboarders and freestyle skiers: Do real-life impacts exceed helmet testing standards? British journal of sports medicine. 2018;52(1):32-40.

B. R. Cobb, A. MacAlister, T. J. Young, A. R. Kemper, S. Rowson, and S. M. Duma, "Quantitative comparison of Hybrid III and National Operating Committee on Standards for Athletic Equipment headform shape characteristics and implications on football helmet fit," Proceedings of the Institution of Mechanical Engineers, Part P: Journal of Sports Engineering and Technology, vol. 229, No. 1, pp. 39-46, 2015.

B. R. Cobb, A. M. Zadnik, and S. Rowson, "Comparative analysis of helmeted impact response of Hybrid III and National Operating Committee on Standards for Athletic Equipment headforms," Pro-

(56) References Cited

OTHER PUBLICATIONS ceedings of the Institution of Mechanical Engineers, Part P: Journal of Sports Engineering and Technology, vol. 230, No. 1, pp. 50-60, 2016.

Non-Final Office Action received in U.S. Appl. No. 18/327,545 mailed Nov. 20, 2024.

Final Office Action Received in U.S. Appl. No. 18/172,109 Mailed Oct. 27, 2025.

Final Office Action Received in U.S. Appl. No. 18/172,127 Mailed on Oct. 27, 2025.

Final Office Action Received in U.S. Appl. No. 18/327,545 Mailed on Apr. 28, 2025.

Katherine M. Breedlove et al., "The Ability of an Aftermarket Helmet Add-On Device to Reduce Impact-Force Accelerations During Drop Tests", Journal of Athletic Training 2017;52(9): pp. 802-808.

Katherine M. Breedlove et al., "The effect of football helmet facemasks on impact behavior during linear drop tests", Journal of Biomechanics 79 (2018) 227-231.

Non-Final Office Action Received in U.S. Appl. No. 18/172,109 mailed Jul. 15, 2025.

Non-Final Office Action Received in U.S. Appl. No. 18/172,127 mailed on Jul. 22, 2025.

Non-Final Office Action Received in U.S. Appl. No. 18/327,545 mailed Sep. 3, 2025.

Oscar Juste-Lorente et al., "The Influence of Headform/Helmet Friction on Head Impact Biomechanics in Oblique Impacts at Different Tangential Velocities", Appl. Sci. 2021, 11, 11318, https://doi.org/10.3390/app112311318.

\* cited by examiner

EQUESTRIAN HELMET STAR SYSTEM

CROSS REFERENCE TO RELATED APPLICATIONS

This application claims the benefit of and priority to U.S. Provisional Application Ser. No. 63/370,019, filed Aug. 1, 2022, titled "EQUESTRIAN HELMET STAR SYSTEM," the entire contents of which are hereby incorporated herein by reference.

BACKGROUND

In the United States over 30 million people ride horses yearly, and there are over 50,000 emergency room visits due to equestrian injuries. Equestrian sports include many events, such as dressage, show jumping, and cross country. In these activities, the most common mechanism of injury is falling from the horse and impacting the ground. These falls result in equestrian sports having a higher risk of severe injury compared to both American football and motorcycling. Moreover, equestrian sports are the greatest contributor of all sports-related traumatic brains injuries, contributing 45 percent (%) of the total sports related brain injuries.

Of all the injuries obtained through equestrian sports, head injuries are the most dangerous and life-threatening. Because these head injuries can be severe, they are the leading cause of hospitalizations and death resulting from equestrian sports. Not only are head injuries caused by equestrian falls dangerous, but they also occur frequently. Twenty percent of equestrian riders have experienced a head injury, and the majority of these head injuries were concussions. Concussions are one of the most common injuries observed in equestrian sports.

When worn, equestrian helmets have been shown to reduce equestrian head injuries by 30% and severe head injuries by 50%. This demonstrates that such helmets can reduce head injury risk, and it also indicates that there is room for improvement. Given the high risk of head injuries in equestrian sports, intensive equestrian helmet safety standards are used to design and evaluate the impact performance of various equestrian helmets.

SUMMARY

The present disclosure is directed to a helmet evaluation system. More specifically, described herein is an equestrian helmet evaluation system that can be used to evaluate the biomechanical performance and risk of head injury for equestrian helmets. To achieve this, the equestrian helmet evaluation system accounts for various impact information specific to equestrian helmets, activities, venues, and accidents. Examples of such information include linear and rotational kinematics data associated with common equestrian falls and equestrian fall exposure data associated with common impact locations on equestrian helmets, among other information.

The equestrian helmet evaluation system described herein can be used to evaluate and rank any model of equestrian helmet with respect to any number of different models of other equestrian helmets. For example, the equestrian helmet evaluation system can be used to generate a rating system that ranks different models of equestrian helmets that have been tested as described in examples herein and categorized according to a numerical range based on performance.

Aspects and advantages of embodiments of the present disclosure will be set forth in part in the following description or can be learned from the description or through practice of the embodiments. Other aspects and advantages of embodiments of the present disclosure will become better understood with reference to the appended claims and the accompanying drawings, all of which are incorporated in and constitute a part of this specification. The drawings illustrate example embodiments of the present disclosure and, together with the description, serve to explain the related concepts of the present disclosure.

In one example embodiment, a method for evaluating a helmet is described. The method includes applying a first impact configuration to a helmet and a second helmet that is a same model as the helmet. The first impact configuration includes a first pair of single impacts applied separately to a front of each of the helmet and the second helmet at a first velocity, a second pair of single impacts applied separately to a side of each of the helmet and the second helmet at a second velocity, and a third pair of single impacts applied separately to a rear of each of the helmet and the second helmet at the first velocity. The method further includes applying a second impact configuration to a third helmet and a fourth helmet that are each the same model as the helmet. The second impact configuration includes a fourth pair of single impacts applied separately to a front of each of the third helmet and the fourth helmet at the second velocity, a fifth pair of single impacts applied separately to a side of each of the third helmet and the fourth helmet at the first velocity, and a sixth pair of single impacts applied separately to a rear of each of the third helmet and the fourth helmet at the second velocity. The method further includes obtaining a plurality of linear and angular acceleration values associated with the first and the second impact configurations. The method further includes determining a plurality of injury risk values associated with the first and the second impact configurations. The method further includes determining an overall injury risk metric for the helmet based on the plurality of injury risk values and a plurality of exposure values associated with the first and the second impact configurations.

BRIEF DESCRIPTION OF THE DRAWINGS

Many aspects of the present disclosure can be better understood with reference to the following figures. The components in the figures are not necessarily to scale, with emphasis instead being placed upon clearly illustrating the concepts of the disclosure. Moreover, repeated use of reference characters or numerals in the figures is intended to represent the same or analogous features, elements, or operations across different figures. Repeated description of such repeated reference characters or numerals is omitted for brevity.

DETAILED DESCRIPTION

Figures 1, 2:
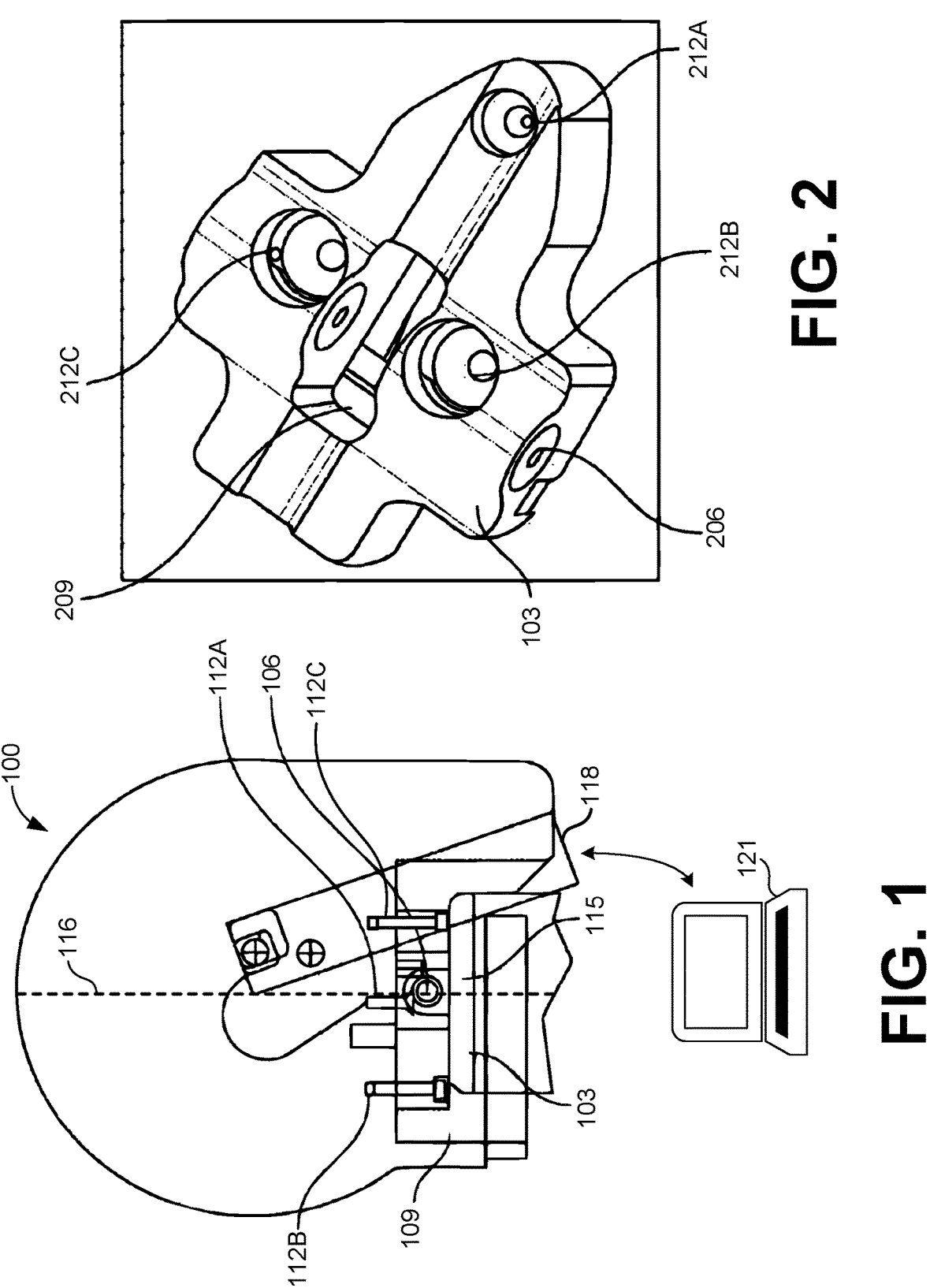
FIG. 1 illustrates a cross sectional view of an example headform that can be used for impact testing of helmets in accordance with various embodiments of the present disclosure.
FIG. 2 illustrates an adapter that can be used to connect the example headform shown in FIG. 1 to a neck structure in accordance with various embodiments of the present disclosure.

Aspects of the present disclosure relate to methods for evaluating injury mitigation performance of helmets that are used for sports or activities requiring protective head equipment (e.g., equestrian sports). Current equestrian helmet evaluation standards are similar to many historical helmet evaluation standards, and they only evaluate a linear acceleration component. However, both linear and angular acceleration occur during head impacts, and it is important to evaluate angular acceleration relative to brain injuries as part of impact testing of helmets. By lowering both linear and angular acceleration in laboratory tests, it has been shown that brain injury risk is lowered in real-world head impact events. Given the serious head injuries observed in equestrian sports, both linear and angular acceleration measures should be analyzed when evaluating the biomechanical performance of helmets for equestrian sports and similar activities.

In addition to not accounting for angular acceleration, other limitations of current equestrian helmet evaluation standards are that they are pass/fail and they only include testing at a single energy level (e.g., a single impact velocity). The limitations described above reduce the ability of current standards to access helmet performance. Further, research suggests that at least one of the current equestrian helmet evaluation standards is not representative of real-world equestrian head impacts, as the linear acceleration threshold for such a standard was higher than reconstructed real-world impacts that resulted in concussions. For at least the reasons described above, current standards are not only unable to differentiate between helmets that have passed the standards, they are also unable to accurately assess a helmet's ability to reduce head injuries.

Some current equestrian helmet evaluation methodologies use linear and rotational acceleration data obtained for a limited number of specific equestrian helmets, to evaluate and compare such helmets. However, although such current methodologies may provide viable and useful performance information pertaining to a limited number of specific equestrian helmets, they are limited in scope, as they cannot be applied to evaluate the very large number of other available equestrian helmets.

According to various embodiments, a testing method can measure or evaluate the concussion mitigation performance of helmets (e.g., equestrian helmets) used for sports, such as for equestrian sports or activities. The method is referenced herein as a Summation of Tests for the Analysis of Risk (STAR) method in some examples, but variations of the method can be practiced based on the concepts described herein, regardless of the use of any shorthand names. Although the embodiments of the present disclosure will discuss the STAR method with reference to equestrian helmets, any suitable helmet used for sports or similar activities may be evaluated using the STAR method described herein.

The STAR method combines impact testing of helmets with an injury risk function as well as exposure data to generate a summary of helmet performance. Impact testing of helmets may be carried out with various dummy headforms that are mounted on various dummy necks. For example, one such configuration can include an equestrian helmet positioned on a NOCSAE® headform that has been mounted on a Hybrid III neck. The NOCSAE® headform and the Hybrid III neck correspond to one example configuration, and other configurations involving dummy headforms and necks may be used for impact testing without departing from the spirit and scope of the embodiments presented herein.

Instrumentation can be positioned within the headform that measures linear acceleration, angular velocity, angular acceleration, and other inertial measurements. In some cases, angular acceleration may be determined from measured angular velocity. Impact tests can be performed at a range of impact locations and energy levels that include both centric and non-centric impact configurations, which can affect the evaluation of concussion mitigation performance. For each impact test, the peak linear and angular acceleration values are inserted into a brain injury risk function, and the values from the brain injury risk function can be multiplied by an exposure value to obtain a weighted risk value.

The weighted risk values from the impact tests can be further evaluated using a function or equation. The function or equation aggregates the data from the impact tests into a number or metric, as a score representative of the performance of helmets. The score can then be used to categorize helmets into a rating system that includes numerical ranges (e.g., 0-5 with 5 being the best performing category). Helmets with higher ratings do a better job of managing impact energy and ultimately lowering the linear and angular acceleration values the head would experience for a given impact. The appeal of the rating system is that it can differentiate complex helmet performance into usable information for consumers. Moreover, on-field studies have shown brain injury reduction rates in athletes who wear higher rated helmets.

Turning to the drawings, FIG. 1 shows a cross sectional view of a headform 100 that can be used for impact testing of helmets (e.g., equestrian helmets) used for sports or other activities according to the methods described herein. The headform 100 includes an opening 109 in a lower region (toward the chin of the headform 100), a sensor package 118, fasteners 112A-112C, an occipital condyle pin 106, and an adapter 103.

Figure 3:
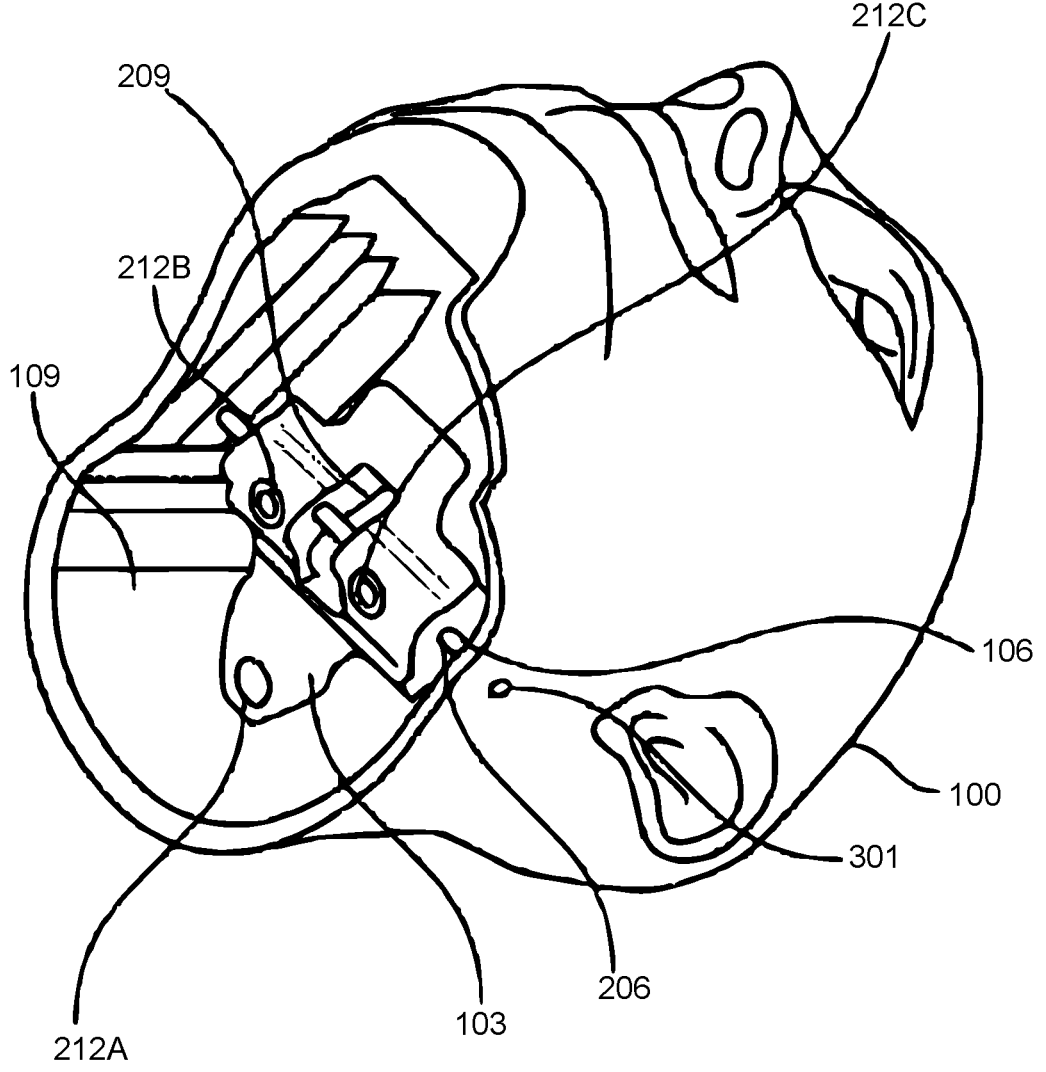
FIG. 3 illustrates a side view of the example headform shown in FIG. 1 with the adapter secured to the example headform in accordance with various embodiments of the present disclosure.

FIG. 1 also illustrates a portion of a neck 115 that attaches to the headform 100 through the adapter 103 at the opening 109. The adapter 103 can be used to mount the headform 100 to the neck 115. In this respect, the adapter 103 can include a custom adapter plate that provides anatomically accurate relative locations of the occipital condyle pin 106 and center of gravity 116 of the headform 100. In some embodiments, the headform 100 and the neck 115 can include a NOCSAE® headform and a Hybrid III 50$^{th}$ percentile neck, respectively. However, other combinations of dummy headforms and necks can be used to conduct the impact tests discussed herein. A detailed view of the adapter 103 is illustrated in FIG. 2. A side view of the headform 100 with the attached adapter 103 is illustrated in FIG. 3.

The adapter 103 can include mounting holes 212A-212C, which can receive fasteners 112A-112C located within the headform 100, to secure the headform 100 to the adapter 103. As such, the adapter 103 can improve the anatomical accuracy of the location of the center of gravity 116 of the headform 100. A bore 206 in the adapter 103 and opening 301 (shown in FIG. 3) in the headform 100 can be matched to receive the occipital condyle pin 106. An opening 209 in the adapter 103 can be used to connect the neck 115 to the headform 100. The adapter 103, through the mounting holes 212A-212C and the fasteners 112A-112C, enable the head-form 100 to be secured in a position that allows impact testing of helmets (e.g., equestrian helmets) used for sports, such as for equestrian sports or related activities. The headform 100 can include various types of dummy head-forms, such as the NOCSAE® headform, that are suitable for fitting equestrian helmets. The neck 115 can include various types of dummy necks, such as the Hybrid III 50$^{th}$ percentile male neck, that can be attached to the headform 100 and is suitable for impact testing of helmets.

The sensor package 118 can be attached near the center of gravity 116 of the headform 100. The sensor package 118 can include multiple accelerometers, angular rate sensors, or other inertial measurement or sensor units that measure linear acceleration, angular velocity, angular acceleration, and other inertial metrics generated by head impacts during testing of helmets, such as equestrian helmets. In some embodiments, the sensor package 118 can include a six degree of freedom (6DoF) sensor package that includes three accelerometers and a triaxial angular rate sensor. However, other quantities and combinations of linear accel-erometers, angular accelerometers, and angular rate sensors can be employed within the headform 100 to measure linear acceleration, angular velocity, and/or angular acceleration. In some cases, angular acceleration values may be deter-mined based on the angular velocity data.

The sensor package 118 can be embodied as one or more accelerometers. As one example, the sensor package 118 is capable of measuring acceleration (i.e., the rate of change of velocity) as compared to its own instantaneous rest frame and provide feedback signals or data representative of the acceleration. The accelerometers of the sensor package 118 can be single or multi-axis accelerometers, capable of detecting both the magnitude and the direction of the accel-eration in some cases, as a vector quantity. In some cases, the sensor package 118 can be an inertial measurement unit (IMU) capable of also measuring orientation, positional angular information, velocity, and other inertial information related to the headform 100. Thus, the sensor package 118 can also sense orientation, coordinate acceleration, vibra-tion, shock, and falling motions in some cases. Examples of the accelerometers of the sensor package 118 can include accelerometers from Endevco®, Piezotronics®, Dytran®, Honeywell®, Bosch®, and other manufacturers.

The sensor package 118 can be in data communication with computing device 121. The computing device 121 can include one or more processing circuits, for example, having processors and memories or memory devices, which can be coupled to a local interface for data communication. The processing circuits of the computing device 121 can process data, as described herein, such as linear acceleration data, angular velocity data, angular acceleration data, and other types of data. In some cases, the computing device 121 can include data sampling, filtering, and processing devices or systems, for processing data from the sensor package 118. The computing device 121 can also include power sources, such as batteries or other power sources. The local interfaces of the computing device 121 can be embodied as wired, wireless, or wired and wireless local interfaces. The sensor package 118 may communicate with the computing device 121 through one or more wired, WiFi, Bluetooth®, near-field communication (NFC), radio-frequency identification (RFID), wireless infrared, ultra wideband, wireless induc-tion, long range (LoRa), Z-Wave®, ZigBee®, etc., inter-faces.

Figures 4A, 4B:
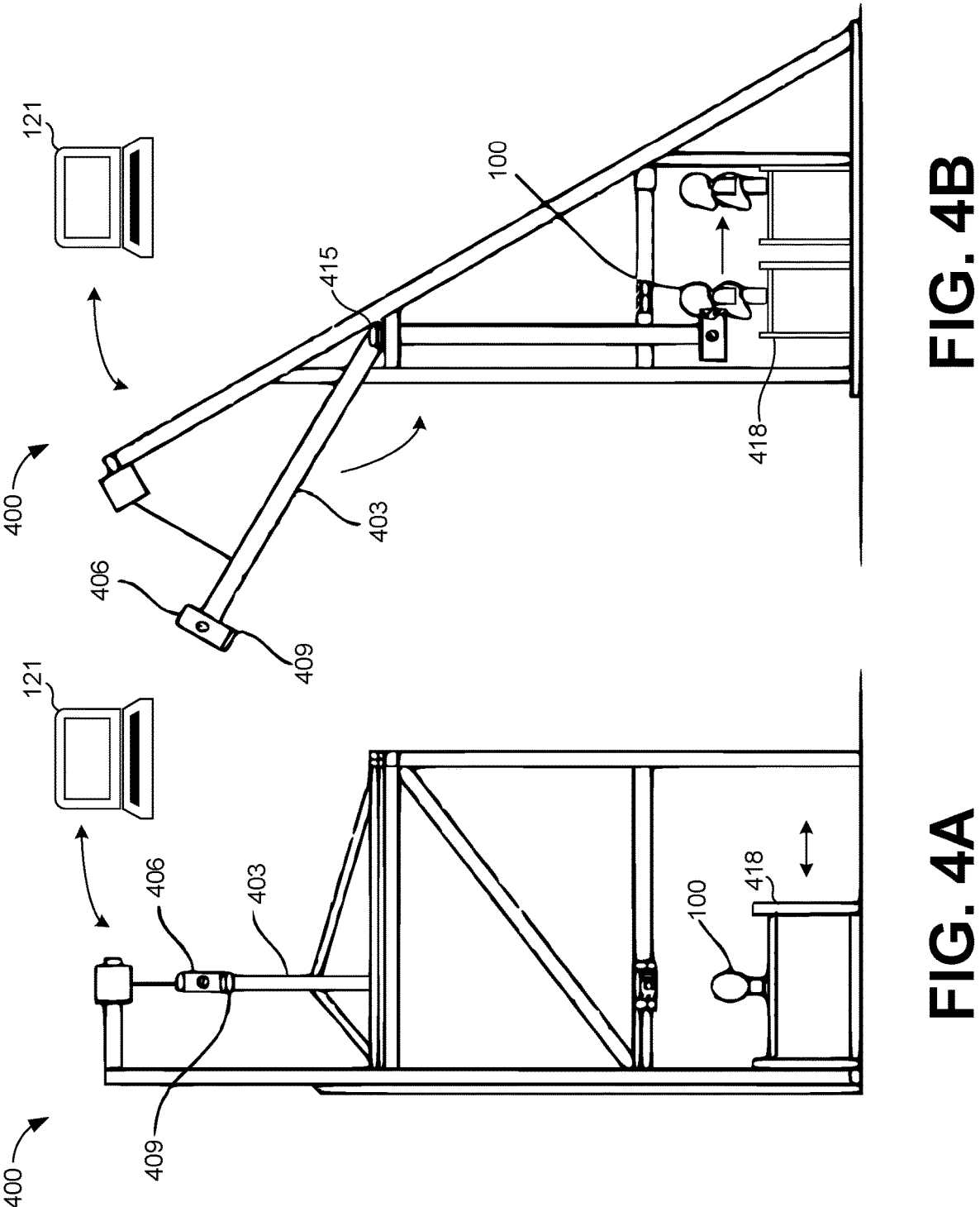
FIG. 4A illustrates a pendulum impact testing apparatus in a resting position in accordance with various embodiments of the present disclosure.
FIG. 4B illustrates the pendulum impact testing apparatus impacting the example headform shown in FIG. 1 in accordance with various embodiments of the present disclosure.

FIGS. 4A-4B illustrate various views of a pendulum impact testing apparatus 400 that can be used to impact the headform 100 during impact testing of helmets. As dis-cussed previously, the testing methods described herein incorporate impact testing of helmets and use of a concus-sion risk function to analyze linear and angular acceleration values resulting from the said impact tests. The pendulum impact testing apparatus 400 includes a movable arm 403, an impactor 406, an impactor face 409, a pivot point 415, and a sliding mass 418. The pendulum impact testing apparatus 400 can be used to conduct the impact testing portion of the testing methods. Use of the pendulum impact testing appa-ratus 400 is beneficial in that it enables an easily repeatable system to conduct the impact tests.

In one embodiment, the movable arm 403 can be com-posed of a 10.16 centimeter (cm)×5.8 cm rectangular alu-minum tubing, with the impactor 406 having a mass of 16.3 kilograms (kg). The length of the arm 403 from the center of the pivot point 415 to the center of the impactor 406 can be 190.5 cm. The arm 403 can have a total mass of 36.3 kg and a moment of inertia of 72 kg meter$^2$ (m$^2$). The impactor face 409 can be flat, constructed of nylon, and have a diameter of 20.3 cm. The impactor face 409 can be designed to mimic different types of ground surfaces on which equestrian activities are commonly performed, which can maximize repeatability and reproducibility of the impact tests. Examples of such different types of ground surfaces can include sand, raked sand, dirt, raked dirt, smoothed dirt, raked and smoothed dirt, grass, artificial grass, and artificial turf. The pendulum impact testing apparatus 400 can be controlled by a winch system equipped with an electromag-net attached to the arm 403 in order to raise and release it at desired angles correlated with various velocities. In some cases, the winch system may be pneumatically or hydrau-lically driven. Other pendulum impact testing apparatuses and related impact testing tools can be relied upon to gather impact data for evaluation using the concussion risk func-tions described herein.

In addition, components of the impact testing apparatus 400 may be controlled or directed, at least in part, by the computing device 121. For example, the computing device 121 may be in data communication with the winch system to control the angle and velocity at which the impactor 406 impacts an equestrian helmet on the headform 100 using electromechanical actuators, switches, motors, and other systems. The impact testing apparatus 400 may communi-cate with the computing device 121 through one or more wired, WiFi, Bluetooth®, near-field communication (NFC), radio-frequency identification (RFID), wireless infrared, ultra wideband, wireless induction, long range (LoRa), Z-Wave®, ZigBee®, etc., interfaces. According to one embodiment, the pendulum impact testing apparatus 400 can be configured so that the impactor face 409 strikes an equestrian helmet on the headform 100 at either 5.0 meters/ second (m/s) or 6.3 m/s.

In order to carry out the impact tests, a helmet is first positioned on the headform 100. As discussed previously, the headform 100 and the neck 115 can include a NOC-SAE® headform and a Hybrid III 50$^{th}$ percentile male neck, respectively. The NOCSAE® headform can be mounted to the Hybrid III 50$^{th}$ percentile male neck using the adapter 103, which provides anatomically accurate relative locations of the occipital condyle pin 106 and the center of gravity 116 of the headform 100. The headform 100 and the neck 115 are then positioned on the sliding mass 418. The sliding mass 418 can be designed to simulate the effective torso mass of a $50^{th}$ percentile male during ahead impact according to one example, thereby increasing the biofidelity of the impact configuration. In one example, the sliding mass 418 can be mounted to an adjustable table commonly used for impact testing.

The impactor 406 provides an impacting mass that is adjustable to emulate a full range of head impact character-istics experienced by individuals, such as participants in equestrian or related activities. In this regard, the impactor face 409 may be of a certain shape, size, and weight that emulates characteristics of the aforementioned example ground surfaces equestrian participants may frequently come into contact with to cause injury. In some cases, the impactor face 409 may be flat to emulate the shape of a ground surface such as dirt or sand, since many injuries caused in equestrian sports involve head contact with the ground. When activated, the arm 403 pivots from the pivot point 415 causing the impactor face 409 to strike the helmet on the headform 100.

FIG. 4A illustrates the pendulum impact testing apparatus 400 in its resting position before activation. The arm 403 has not yet been activated, and the headform 100 positioned on the sliding mass 418 is in its starting position. FIG. 4B illustrates the pendulum impact testing apparatus 400 that has been activated. In some cases, the pendulum impact testing apparatus 400 can be controlled by the computing device 121, allowing for the velocity and angle of impact to be configured in an automated fashion based on control of a user interface of the computing device 121. In some cases, the pendulum impact testing apparatus 400 may be manually configured by a user (e.g., user who controls the winch system). When the arm 403 pivots from the pivot point 415 and the impactor surface 409 strikes the helmet on the headform 100, the sliding mass 418 and the headform 100 may change positions as depicted.

Figures 5A, 5B:
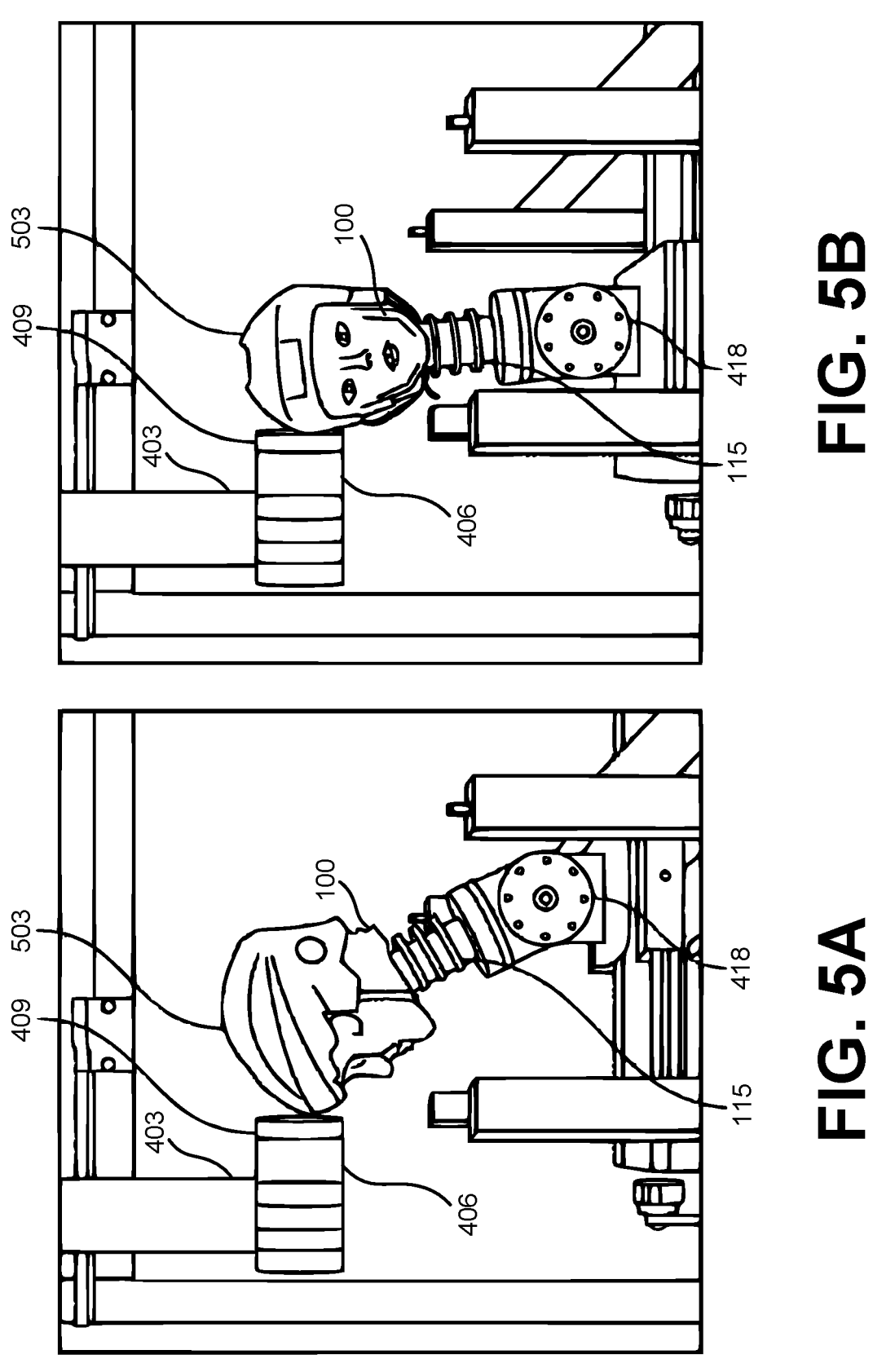
FIGS. 5A-5C illustrate close-up views of an impactor striking various locations of a helmet positioned on the example headform shown in FIG. 1 in accordance with various embodiments of the present disclosure.
Figure 5C:
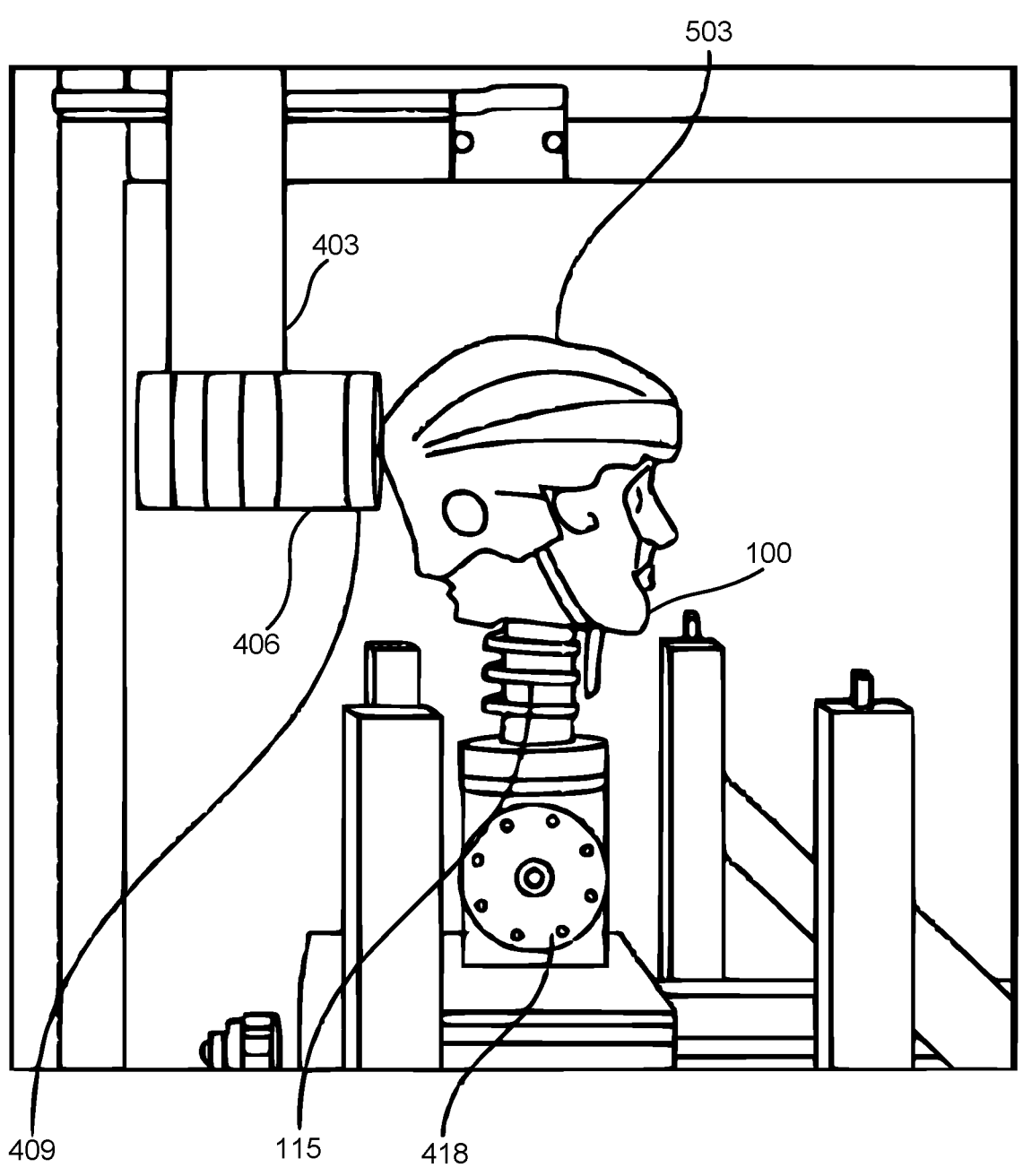

FIGS. 5A-5C illustrate a close-up view of the impactor face 409 striking various locations of a helmet 503 posi-tioned on the headform 100. The helmet 503 can include any helmet that is used for sports or other activities requiring protective head equipment, such as for equestrian activities (e.g., cross country, show jumping, and dressage). In this respect, the helmet 503 includes various models of eques-trian helmets marketed for equestrian use.

The methods described herein, for use with equestrian helmets, rely upon impact tests conducted at multiple loca-tions of the helmet 503. In one embodiment, two impact configurations that each have three testing configurations can be used to test the model of the helmet 503. Each of the three testing configurations include a certain combination of one of three different impact locations of the helmet 503 and one of two different impact velocities. The three different locations include a front of the helmet 503, a side of the helmet 503, and a rear of the helmet 503. The two different velocities are configurable by the user but were selected as 5.0 m/s and 6.3 m/s, in one example, for testing of equestrian helmets to respectively replicate a medium and high energy impact according to one experiment that was conducted. Other impact velocities can be relied upon in some cases.

To generate accurate test results, each impact location of the helmet 503 may be impacted only once. That is, to apply the two impact configurations to the helmet 503, which requires a total of six impacts (i.e., three impacts at a first impact velocity and three impacts at a second impact veloc-ity), a second helmet of the same model as the helmet 503 can be used. Thus, the helmet 503 can be impact tested according to one of the two impact configurations and the second helmet can be impact tested according to the other of the two impact configurations. Each impact location being impacted only once may ensure that any deformation caused by testing does not affect any future tests.

Additionally, to further augment the accuracy of the test results and evaluation of the helmet 503, each of the two impact configurations can be duplicated using a third and a fourth helmet that are each of the same model as the helmet 503. For instance, the third helmet can be impact tested according to one of the two impact configurations and the fourth helmet can be impact tested according to the other of the two impact configurations. In particular, in this example, the third helmet can be impact tested according to the three testing configurations of one of the two impact configura-tions and the fourth helmet can be impact tested according to the three testing configurations of the other of the two impact configurations. Duplicating the two impact configu-rations using four different helmets of the same model as the helmet 503 provides a larger amount of test data for a particular model of helmet, which facilitates more accurate evaluation of the helmet 503 according to examples described herein. In one example, impact algorithm 600 described herein and illustrated in FIG. 6 can be imple-mented to duplicate the two impact configurations using four different helmets of the same model as the model helmet 503.

Figure 6:
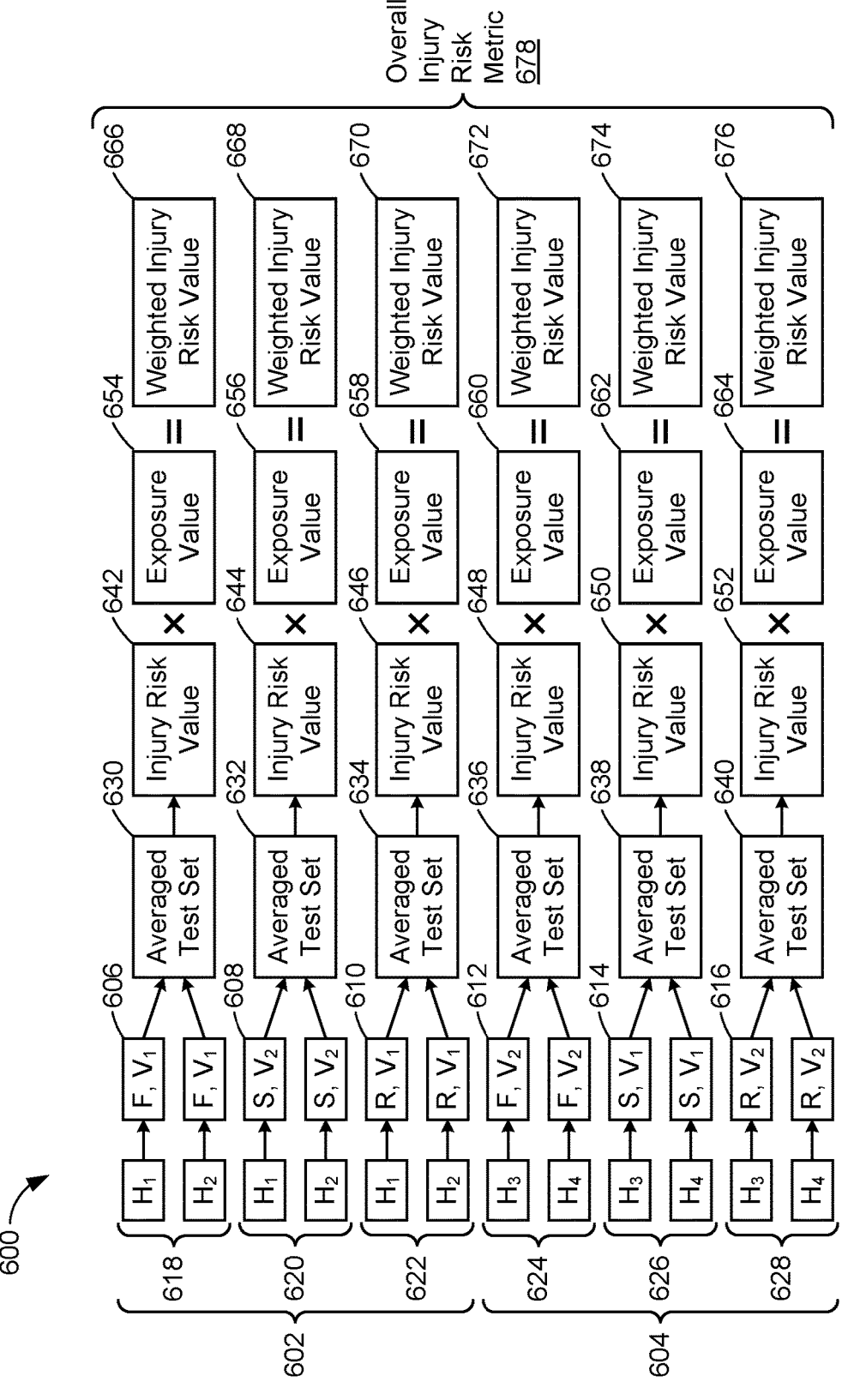
FIG. 6 illustrates an example impact algorithm in accordance with various embodiments of the present disclosure.

FIG. 6 illustrates an example impact algorithm 600 in accordance with various embodiments of the present disclo-sure. The impact algorithm 600 includes a first impact configuration 602 that can be applied to the helmet 503 ("$H_1$" in FIG. 6) and a second helmet ("$H_2$") that is a same model as the helmet 503. The impact algorithm 600 also includes a second impact configuration 604 that can be applied to a third helmet ("$H_3$") and a fourth helmet ("$H_4$") that are each of the same model as the helmet 503.

In the example depicted in FIG. 6, the first and second impact configurations 602, 604 collectively include testing configurations 606, 608, 610, 612, 614, 616. Each of the testing configurations 606, 608, 610, 612, 614, 616 includes a single impact to either a front ("F"), a side ("S"), or a rear ("R") of a helmet at a first velocity ("$V_1$") such as, for instance, approximately 5.0 m/s or a second velocity ("$V_2$") such as, for instance, approximately 6.3 m/s. In this example, each of the testing configurations 606, 608, 610, 612, 614, 616 is duplicated using the helmet 503 ("$H_1$"), the second helmet ("$H_2$"), the third helmet ("$H_3$"), and the fourth helmet ("$H_4$").

In the example illustrated in FIG. 6, the testing configu-ration 606 is duplicated by separately applying a single impact of a first pair of single impacts 618 to a front ("F") of each of the helmet 503 ("$H_1$") and the second helmet ("$H_2$") at the first velocity ("$V_1$"). The testing configuration 608 is duplicated in this example by separately applying a single impact of a second pair of single impacts 620 to a side ("S") of each of the helmet 503 ("$H_1$") and the second helmet ("$H_2$") at the second velocity ("$V_2$"). The testing configuration 610 is duplicated in this example by separately applying a single impact of a third pair of single impacts 622 to a rear ("R") of each of the helmet 503 ("$H_1$") and the second helmet ("$H_2$") at the first velocity ("$V_1$").

Additionally, in the example illustrated in FIG. 6, the testing configuration 612 is duplicated by separately apply-ing a single impact of a fourth pair of single impacts 624 to a front ("F") of each of the third helmet ("H$_3$") and the fourth helmet ("H$_4$") at the second velocity ("V$_2$"). The testing configuration 614 is duplicated in this example by separately applying a single impact of a fifth pair of single impacts 626 to a side ("S") of each of the third helmet ("H$_3$") and the fourth helmet ("H$_4$") at the first velocity ("V$_1$"). The testing configuration 616 is duplicated in this example by separately applying a single impact of a sixth pair of single impacts 628 to a rear ("R") of each of the third helmet ("H$_3$") and the fourth helmet ("H$_4$") at the second velocity ("V$_2$").

With the testing configurations 606, 608, 610, 612, 614, 616 occurring at multiple locations on the helmet 503, FIGS. 5A-5C depict the impactor face 409 impacting the front, the side, and the rear of the helmet 503, respectively. FIGS. 5A-5C also serve as illustrative examples of the aforementioned duplications of the testing configurations 606, 608, 610, 612, 614, 616. That is, FIGS. 5A-5C also serve as illustrative examples of the impactor face 409 impacting the front, the side, and the rear, respectively, of the second helmet ("H$_2$"), the third helmet ("H$_3$"), and the fourth helmet ("H$_4$"). When the helmet 503 ("H$_1$"), the second helmet ("H$_2$"), the third helmet ("H$_3$"), and the fourth helmet ("H$_4$") are respectively impacted, resultant linear and angular accelerations are generated by the sensor package 118 based on translations and rotations of the headform 100 on the sliding mass 418. In the example illustrated in FIG. 6, the resultant linear and angular acceleration values that are respectively generated for each of the pairs of single impacts 618, 620, 622, 624, 626, 628 are respectively averaged to obtain averaged test sets 630, 632, 634, 636, 638, 640. Each of the averaged test sets 630, 632, 634, 636, 638, 640 includes an averaged linear acceleration value and an averaged angular acceleration value resulting from the respective duplicated application of each of the testing configurations 606, 608, 610, 612, 614, 616.

Figure 7:
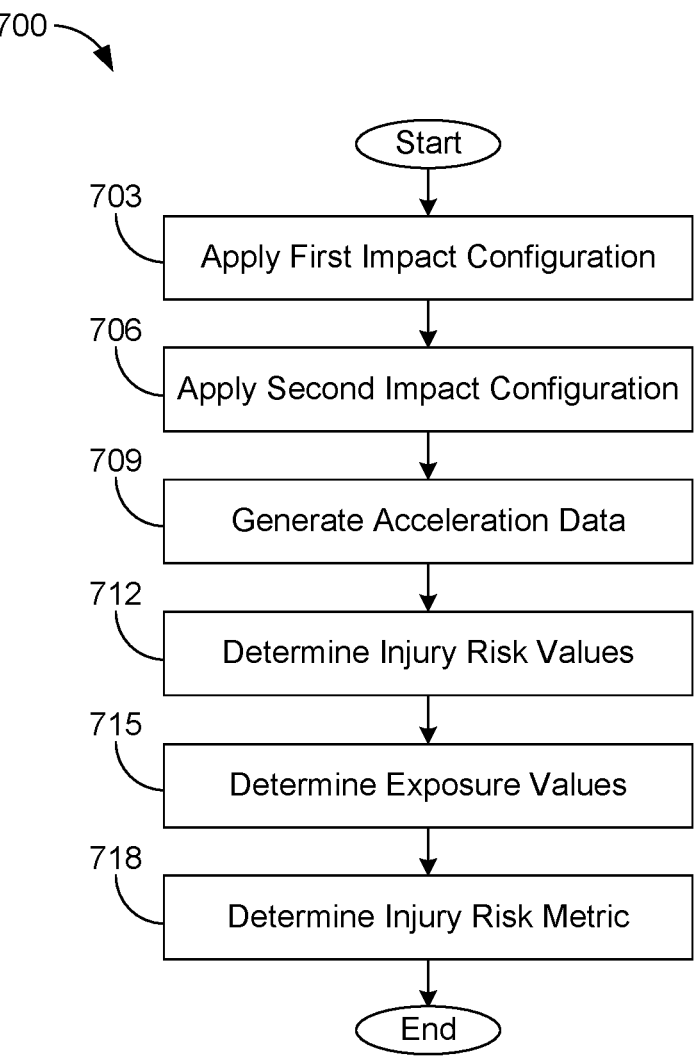
FIG. 7 is a flowchart illustrating exemplary steps of a method to evaluate concussion mitigation performance of helmets in accordance with various embodiments of the present disclosure.

In the example depicted in FIG. 6, the averaged test sets 630, 632, 634, 636, 638, 640 are then used to respectively calculate concussion (injury) risk values 642, 644, 646, 648, 650, 652 for the testing configurations 606, 608, 610, 612, 614, 616 by using a concussion risk function described herein with reference to FIG. 7. That is, the concussion risk function denoted herein as "Eq. 1" and described with reference to FIG. 7 is then used to respectively calculate injury risk values 642, 644, 646, 648, 650, 652 based on the averaged test sets 630, 632, 634, 636, 638, 640.

In the example depicted in FIG. 6, the injury risk values 642, 644, 646, 648, 650, 652 are then respectively multiplied by an exposure value 654, 656, 658, 660, 662, 664 to respectively obtain weighted concussion (injury) risk values 666, 668, 670, 672, 674, 676. The exposure values 654, 656, 658, 660, 662, 664 are determined based on and correspond to the respective impact locations of the testing configurations 606, 608, 610, 612, 614, 616. In this example, the exposure values 654, 660 each correspond to a front ("F") impact location and are each equivalent to a value of one, although another value can be used in some cases. In this example, the exposure values 656, 662 each correspond to a side ("S") impact location and are each equivalent to a value of two, although another value can be used in some cases. In this example, the exposure values 658, 664 each correspond to a rear ("R") impact location and are each equivalent to a value of three, although another value can be used in some cases. The exposure values 654, 656, 658, 660, 662, 664 each denote a relative frequency of impact that could respectively occur at the front, the side, and the rear of the helmet 503. In this example, the weighted injury risk values 666, 668, 670, 672, 674, 676 are then aggregated (i.e., added, summed, totaled) to determine an overall concussion (injury) risk metric 678 for the helmet 503.

The impactor face 409 is flat to simulate a ground surface such as dirt or sand, since many injuries caused in equestrian sports involve head contact with the ground. However, other impactor surfaces of a different shape, weight, and surface can be used to simulate other injury contact surfaces that may be prevalent in an equestrian activity (e.g., cross country, show jumping, and dressage). In some embodiments, fewer or greater than two impact configurations, six testing configurations, three impact locations, and two impact velocities may be used to conduct impact testing of the helmet 503. That is, any one of the three aforementioned impact locations may or may not be impacted, one or both of the different impact velocities may or may not be used, and a second, third, and fourth helmet of the same model as the helmet 503 may or may not be used. In some cases, more than four helmets of the same model may be tested.

In some examples, the impact algorithm 600 and the equipment used to implement the impact algorithm 600 can be defined and selected, respectively, as described in Appendix A of U.S. Provisional Application Ser. No. 63/370,019, the entire contents of which are incorporated herein. In one example, the exposure values 654, 656, 658, 660, 662, 664 can be determined as described in Part 1, titled "Video Analysis of Equestrian Falls" of each of the "Methods" and "Results" sections of Appendix A included with U.S. Provisional Application Ser. No. 63/370,019 ("the '019 application"), the entire contents of which is incorporated herein. In another example, the pendulum impact testing apparatus 400 can be selected to perform various impact testing described herein based on the in-field and in-lab experimentation and analysis described in Parts 2 and 3, respectively titled "Laboratory System Comparison" and "Onsite Field Testing" of each of the "Methods" and "Results" sections of Appendix A in the '019 application. In another example, the impactor face 409 can be selected as a flat surface based on the in-lab experimentation and analysis described in Part 4, titled "Laboratory Impactor Surface Comparison" of each of the "Methods" and "Results" sections of Appendix A in the '019 application.

The different first and second impact velocities ("V$_1$" and "V$_2$") can be selected to replicate a medium and high energy impact, respectively, where the medium energy impact corresponds to a medium fall height and the high energy impact corresponds to a high fall height. In one example, the first and second impact velocities ("V$_1$" and "V$_2$") can be selected as described in Appendix A in the '019 application. Although a velocity of approximately 5.0 m/s is used herein to represent a medium energy impact and a velocity of approximately 6.3 m/s is used herein to represent a high energy impact, other impact velocities can also be relied upon. In some cases, a velocity of greater than 6.3 m/s may be selected to replicate a high energy impact, and a velocity of lower than 5.0 m/s may be selected to replicate a medium energy impact.

Each impact location being tested once is an important consideration that can be factored in when applying the concussion risk function, which will be discussed in detail in the following paragraphs with respect to the flowchart shown in FIG. 7. In addition, as most, if not all, equestrian helmets can only provide protection against one relatively major impact, the three impact locations (i.e., the front, the side, and the rear) are impacted only once for a given equestrian helmet in accordance with the methods described herein.

FIG. 7 is a flowchart outlining the steps of a method 700 for evaluating the concussion mitigation performance of helmets (e.g., equestrian helmets) or protective head gear used in sports or similar activities. In one example, the method 700 can be implemented according to the impact algorithm 600 described herein with reference to FIG. 6.

At box 703, a first impact configuration is applied to a helmet that is selected for testing. For example, with reference to FIGS. 4A-5C and FIG. 6, the helmet 503 can be tested for concussion mitigation performance by using two helmets of the same model as the helmet 503 to duplicate the first impact configuration at box 703. That is, as described herein with reference to FIG. 6, the helmet 503 ("H$_1$") and the second helmet ("H$_2$") can be used to duplicate each of the testing configurations 606, 608, 610 of the first impact configuration 602. At box 703, the helmet 503 ("H$_1$") and the second helmet ("H$_2$") of the same model as the helmet 503, are individually positioned on the headform 100 based on the helmet manufacturer's fitting guidelines. The headform 100 can be mounted to the neck 115 using the adapter 103. The headform 100 and the neck 115 can be mounted to the sliding mass 418 and can be positioned within an impact area of the pendulum impact testing apparatus 400.

The first impact configuration at box 703 can include impacts to multiple locations on each of the helmet 503 ("H$_1$") and the second helmet ("H$_2$"), using either a first or a second impact velocity at each of such locations. For example, with reference to FIG. 6, the first impact configuration at box 703 can be implemented as the first impact configuration 602, which includes the testing configurations 606, 608, 610. Each of the testing configurations 606, 608, 610 includes a single impact to either a front ("F"), a side ("S"), or a rear ("R") of a helmet at a first velocity ("V$_1$") such as, for instance, approximately 5.0 m/s or a second velocity ("V$_2$") such as, for instance, approximately 6.3 m/s. In this example, each of the testing configurations 606, 608, 610 can be duplicated at box 703 using the helmet 503 ("H$_1$") and the second helmet ("H$_2$") as illustrated in FIG. 6.

For instance, at box 703, the testing configuration 606 can be duplicated by separately applying a single impact of the first pair of single impacts 618 to a front ("F") of each of the helmet 503 ("H$_1$") and the second helmet ("H$_2$") at the first velocity ("V$_1$"). The testing configuration 608 can be duplicated in this example by separately applying a single impact of the second pair of single impacts 620 to a side ("S") of each of the helmet 503 ("H$_1$") and the second helmet ("H$_2$") at the second velocity ("V"). The testing configuration 610 can be duplicated in this example by separately applying a single impact of the third pair of single impacts 622 to a rear ("R") of each of the helmet 503 ("H$_1$") and the second helmet ("H$_2$") at the first velocity ("V$_1$").

In accordance with one example, as shown in FIGS. 5A-5C, the pendulum impact testing apparatus 400 and the headform 100 can be configured so that the impactor 406 respectively impacts the front, the side, and the rear of each of the helmet 503 ("H$_1$") and the second helmet ("H$_2$"), for a total of three impact locations and six individually applied impacts. However, other locations on each of the helmet 503 ("H$_1$") and the second helmet ("H$_2$") may be impacted in some cases. In some cases, the pendulum impact testing apparatus 400 can be controlled by a winch system equipped with an electromagnet in order to raise and release the movable arm 403 at desired angles corresponding to a desired impact velocity. In some cases, the winch system may be pneumatically or hydraulically driven. In some cases, the pendulum impact testing apparatus 400 may also be controlled by the computing device 121.

At box 706, a second impact configuration is applied to a helmet that is selected for testing. For example, with reference to FIGS. 4A-5C and FIG. 6, the helmet 503 can be tested for concussion mitigation performance by using two helmets of the same model as the helmet 503 to duplicate the second impact configuration at box 706. That is, as described herein with reference to FIG. 6, the third helmet ("H$_3$") and the fourth helmet ("H$_4$") can be used to duplicate each of the testing configurations 612, 614, 616 of the second impact configuration 604. At box 706, the third helmet ("H$_3$") and the fourth helmet ("H$_4$"), which are each of the same model as the helmet 503, are individually positioned on the headform 100 based on the helmet manufacturer's fitting guidelines. The headform 100 can be mounted to the neck 115 using the adapter 103. The headform 100 and the neck 115 can be mounted to the sliding mass 418 and can be positioned within an impact area of the pendulum impact testing apparatus 400.

The second impact configuration at box 706 can include impacts to multiple locations on each of the third helmet ("H$_3$") and the fourth helmet ("H$_4$"), using either a first or a second impact velocity at each of such locations. For example, with reference to FIG. 6, the second impact configuration at box 706 can be implemented as the second impact configuration 604, which includes the testing configurations 612, 614, 616. Each of the testing configurations 612, 614, 616 includes a single impact to either a front ("F"), a side ("S"), or a rear ("R") of a helmet at a first velocity ("V$_1$") such as, for instance, approximately 5.0 m/s or a second velocity ("V$_2$") such as, for instance, approximately 6.3 m/s. In this example, each of the testing configurations 612, 614, 616 can be duplicated at box 706 using the third helmet ("H$_3$") and the fourth helmet ("H$_4$") as illustrated in FIG. 6.

For instance, at box 706, the testing configuration 612 can be duplicated by separately applying a single impact of the fourth pair of single impacts 624 to a front ("F") of each of the third helmet ("H$_3$") and the fourth helmet ("H$_4$") at the second velocity ("V$_2$"). The testing configuration 614 can be duplicated in this example by separately applying a single impact of the fifth pair of single impacts 626 to a side ("S") of each of the third helmet ("H$_3$") and the fourth helmet ("H$_4$") at the first velocity ("V$_1$"). The testing configuration 616 can be duplicated in this example by separately applying a single impact of the sixth pair of single impacts 628 to a rear ("R") of each of the third helmet ("H$_3$") and the fourth helmet ("H$_4$") at the second velocity ("V$_2$").

In accordance with one example, as shown in FIGS. 5A-5C, the pendulum impact testing apparatus 400 and the headform 100 can be configured so that the impactor 406 respectively impacts the front, the side, and the rear of each of the third helmet ("H$_3$") and the fourth helmet ("H$_4$"), for a total of three impact locations and six individually applied impacts. However, other locations on each of the third helmet ("H$_3$") and the fourth helmet ("H$_4$") may be impacted in some cases. In some cases, the pendulum impact testing apparatus 400 can be controlled by a winch system equipped with an electromagnet in order to raise and release the movable arm 403 at desired angles corresponding to a desired impact velocity. In some cases, the winch system may be pneumatically or hydraulically driven. In some cases, the pendulum impact testing apparatus 400 may also be controlled by the computing device 121.

At box 709, acceleration data is generated by various accelerometers and sensors that can be positioned within a headform that is being used for impact testing. For example, the sensor package 118, which is positioned within the headform 100 near the center of gravity 116, may include accelerometers and angular rate sensors, among other IMUs. In one embodiment, the sensor package 118 includes a six degree of freedom (6DoF) sensor package that includes three accelerometers and a triaxial angular rate sensor. The three accelerometers can measure linear acceleration data, whereas the triaxial angular rate sensor may measure angular velocity data. In some embodiments, the sensor package 118 may also include angular accelerometers configured to measure angular acceleration, and also a different quantity of accelerometers and/or angular rate sensors.

The computing device 121 may receive the generated data, including the acceleration data and angular velocity data, among other inertial measurement data, and process it as described herein. In cases where angular acceleration is not measured, the computing device 121 may determine the angular acceleration values based on differentiating the angular velocity data. According to one example, the acceleration data and angular velocity data measured for each of the twelve impacts of the impact algorithm 600 and the method 700 can be sampled by the computing device 121 at 20,000 Hertz (Hz) and further filtered by the computing device 121 using a 4-pole Butterworth low pass filter according to SAE J211 (Instrumentation for Impact Test), with a cutoff frequency of 1650 Hz (CFC 1000) for the accelerometer data and 256 Hz (CFC 155) for the angular rate sensor data. In this example, the angular acceleration values can be determined by the computing device 121 by differentiating the angular rate data. Resultant values can then be calculated by the computing device 121 for linear acceleration (denoted in units of grams (g)) and angular acceleration (denoted in units of radians/second$^2$ (rad/sec$^2$)).

At box 709, for each impact that occurs at the aforementioned impact locations, the sensor package 118 can generate linear acceleration data, angular velocity data, angular acceleration data, and other inertial measurement data. For instance, for each single impact of each of the first, second, third, fourth, fifth, and sixth pair of single impacts 618, 620, 622, 624, 626, 628, the sensor package 118 can generate linear acceleration data, angular velocity data, angular acceleration data, and other inertial measurement data. In this example, the computing device 121 can then respectively average the linear and angular acceleration data obtained from each of the first, second, third, fourth, fifth, and sixth pair of single impacts 618, 620, 622, 624, 626, 628, to generate the averaged test sets 630, 632, 634, 636, 638, 640.

At box 712, the linear and angular acceleration values generated at box 709 may be used by the computing device 121 to determine concussion (injury) risk values. For example, the averaged test sets 630, 632, 634, 636, 638, 640 generated at box 709 can be used by the computing device 121 to determine the injury risk values 642, 644, 646, 648, 650, 652 corresponding to the testing configurations 606, 608, 610, 612, 614, 616, respectively. For each of the testing configurations 606, 608, 610, 612, 614, 616 applied at boxes 703 and 706, the computing device 121 is configured to calculate a respective injury risk value 642, 644, 646, 648, 650, 652 based on the following function or equation:

$$R(a, \propto) = \frac{1}{1 + e^{-(-10.2 + 0.0433*a + 0.000873*\propto - 0.000000920*a\propto)}} \qquad \text{Eq. 1}$$

This equation, also referenced herein as the injury risk function or concussion risk function, outputs a respective injury risk value 642, 644, 646, 648, 650, 652 based on each corresponding averaged test set 630, 632, 634, 636, 638, 640, which respectively include an averaged resultant linear acceleration value ($\alpha$) and an averaged resultant angular acceleration value ($\propto$). The concussion risk function includes use of both linear and angular acceleration data because they are both correlated and predictive of concussion. A multivariate logistic regression analysis can be used to model risk as a function of both linear and angular head acceleration. Using the concussion risk function enhances the data analysis by increasing the importance of higher acceleration impacts.

At box 715, exposure values are determined for each impact that occurs as part of the overall impact test. For example, exposure values can be determined based on the respective impact locations of each impact of the testing configurations 606, 608, 610, 612, 614, 616 applied at box 703 and 706. In one example, the exposure values 654, 656, 658, 660, 662, 664 can be determined at box 715 based on the respective impact locations of each impact of the testing configurations 606, 608, 610, 612, 614, 616. In this example, the exposure values 654, 660 each correspond to a front ("F") impact location and are each equivalent to a value of one. In this example, the exposure values 656, 662 each correspond to a side ("S") impact location and are each equivalent to a value of two. In this example, the exposure values 658, 664 each correspond to a rear ("R") impact location and are each equivalent to a value of three.

The exposure values 654, 656, 658, 660, 662, 664 each denote a relative frequency of impact that could respectively occur at the front, the side, and the rear of the helmet 503. The relative frequency of impact can be approximated based on historical equestrian fall data that includes a plurality of equestrian falls resulting in various impacts to different locations on equestrian helmets. By determining how often certain locations of an equestrian helmet are impacted over a given number of equestrian falls, a relative frequency of impact to each of such locations can be approximated and thereafter serve as an exposure value. In some cases, the exposure values described herein can be denoted as a whole number. In these cases, a lower exposure value can correspond to a location on equestrian helmets where impacts have been observed to occur relatively less frequently, whereas a higher exposure value can correspond to a location on equestrian helmets where impacts have been observed to occur relatively more frequently. In one example, the exposure values 654, 656, 658, 660, 662, 664 can be determined as described in Part 1, titled "Video Analysis of Equestrian Falls" of each of the "Methods" and "Results" sections of Appendix A in the '019 application.

Further, most, if not all, equestrian helmets can only provide protection against one relatively major impact. As such, the three impact locations (i.e., the front, the side, and the rear) are impacted only once for a given equestrian helmet in accordance with the impact algorithm 600 and the method 700.

At box 718, a concussion (injury) risk metric is determined for a helmet model based on the exposure values determined at box 715 and the concussion (injury) risk values determined at box 712. The concussion risk metric (also referred to herein as "injury risk metric" or "overall injury risk metric") is determined based on the equation listed below:

$$\text{Equestrian } STAR = \sum_{L=1}^{3} \sum_{V=1}^{2} E(L, V) * R(a, \propto), \qquad \text{Eq. 2}$$

where E represents exposure, L represents impact locations, V represents impact velocity, and R represents concussion risk. With reference to the testing configurations 606, 608, 610, 612, 614, 616 applied at box 703 and 706, by using Eq. 2, individual concussion risk values determined at box 712 for each of these six testing configurations are multiplied by corresponding exposure values determined at box 715. Based on such respective multiplication, corresponding weighted concussion risk values can be obtained. For instance, with reference to FIG. 6, by using Eq. 2, the injury risk values 642, 644, 646, 648, 650, 652 can be respectively multiplied by the exposure values 654, 656, 658, 660, 662, 664 to respectively obtain the weighted concussion (injury) risk values 666, 668, 670, 672, 674, 676. In this example, by using Eq. 2, the weighted concussion (injury) risk values 666, 668, 670, 672, 674, 676 can then be summated together to generate an overall score, such as an overall injury risk metric 678, which can denote a STAR score. In some embodiments, the computing device 121 may perform the steps 712-718 to determine the STAR score for a given helmet model.

The STAR score for a given helmet model is then used to determine a corresponding rating or STAR rating. The STAR score is different from the STAR rating. Lower STAR scores may represent a lower risk of concussion and may be assigned to higher STAR ratings. The STAR rating may range up to five stars for the best available helmets. To provide a useful tool for consumers to make informed decisions, the STAR scores for each helmet can be used to create a STAR rating system having a STAR rating for each helmet tested according to the example methods described herein. Each STAR rating of the STAR rating system can range from five stars for the best performing helmets to one star for the lowest performing helmets.

The high risk of head injury across the majority of equestrian helmets could be responsible for the high head injury rates observed in equestrian activities such as cross country, show jumping, and dressage. The equestrian helmets should reduce the head impact accelerations much more across all helmets to potentially reduce the number of injuries in equestrian sports. In some cases, only a single size of the helmet 503 is tested according to at least one of the impact algorithm 600 or the method 700. Such testing conditions assume that performance is consistent throughout each size of helmet. However, there still could be deviation in performance as size increases or decreases due to potential changes in padding configuration and thickness. Accordingly, further embodiments of the present disclosure may include testing helmets of different sizes and/or weight, with the helmets being the same model. Additional embodiments may include testing helmets designated for different genders (e.g., male or female) of the same model.

The equestrian STAR rating system described herein helps equestrian riders understand how the available equestrian helmets compare to each other in their ability to reduce both linear and rotational head acceleration. The current standards for equestrian helmets are pass/fail only, and do not differentiate between the most and least protective helmets. By giving equestrian riders the information needed to purchase the most protective helmets, the number and severity of head injuries caused by equestrian falls has the potential to decrease. Additionally, the equestrian STAR evaluation methods described herein will help equestrian helmet companies design safer helmets. Equestrian helmet manufacturers can use the results from the equestrian STAR helmet ratings to determine which of their helmet designs are the most effective.

Many researchers have been using lab head impact data alongside computer models that simulate brain tissue strain. The linear and angular head acceleration data discussed herein may be utilized with computer models. This would allow for a better understanding of whitewater head injury response specifically in relation to brain deformation. Computer modeling (e.g., finite element modeling) has also been used in helmet research to design optimized helmet prototypes. These techniques could be applied in conjunction with the equestrian helmet evaluation methods described herein to develop a helmet that is able to substantially reduce head injury risk.

The flowchart of FIG. 7 shows an exemplary implementation of the methods described herein, as applied to testing for concussion mitigation performance of helmets. Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. Further, in some embodiments, one or more of the blocks shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As referenced herein in the context of quantity, the terms "a" or "an" are intended to mean "at least one" and are not intended to imply "one and only one."

As referred to herein, the terms "include," "includes," and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etcetera (etc.)), mechanical coupling, operative coupling, optical coupling, and/or physical coupling.

Approximating language, as used herein throughout the specification, the appended claims, and/or the accompanying drawings is applied to modify any quantitative representation that could permissibly vary without resulting in a change in the basic function to which it is related. Accordingly, a value modified by a term or terms, such as "about," "approximately," and/or "substantially," are not to be limited to the precise value specified. In some embodiments, the approximating language can correspond to the precision of an instrument for measuring the value. For example, the approximating language can refer to being within a 10 percent (%) margin. For instance, as used herein, the term or terms "about," "approximately," and/or "substantially" in conjunction with a numerical value can refer to within 10% of the indicated numerical value.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method of evaluating a helmet, comprising:
applying a first impact configuration to the helmet and a second helmet that is a same model as the helmet, the first impact configuration comprising a first pair of single impacts applied separately to a front of each of the helmet and the second helmet at a first velocity, a second pair of single impacts applied separately to a side of each of the helmet and the second helmet at a second velocity, and a third pair of single impacts applied separately to a rear of each of the helmet and the second helmet at the first velocity;
applying a second impact configuration to a third helmet and a fourth helmet that are each the same model as the helmet, the second impact configuration comprising a fourth pair of single impacts applied separately to a front of each of the third helmet and the fourth helmet at the second velocity, a fifth pair of single impacts applied separately to a side of each of the third helmet and the fourth helmet at the first velocity, and a sixth pair of single impacts applied separately to a rear of each of the third helmet and the fourth helmet at the second velocity;
obtaining a plurality of linear and angular acceleration values associated with the first and the second impact configurations;
determining a plurality of injury risk values associated with the first and the second impact configurations; and
determining an overall injury risk metric for the helmet based on the plurality of injury risk values and a plurality of exposure values associated with the first and the second impact configurations.

2. The method of claim 1, further comprising:
determining the plurality of exposure values associated with the first and the second impact configurations, the plurality of exposure values comprising an exposure value for each of the front, the side, and the rear of the helmet, wherein the exposure value comprises a whole number denoting a relative frequency of impact that could respectively occur at the front, the side, and the rear of the helmet.

3. The method of claim 2, wherein each of the front, the side, and the rear of the helmet corresponds to a different exposure value.

4. The method of claim 1, wherein applying the first and the second impact configuration comprises separately positioning the helmet, the second helmet, the third helmet, and the fourth helmet on a headform, the headform being mounted on a neck using an adaptor to locate a center of gravity of the headform.

5. The method of claim 4, wherein applying the first and the second impact configurations comprises mounting the headform on a sliding mass that simulates an effective torso mass of a human during a head impact, the sliding mass being mounted to an adjustable table.

6. The method of claim 5, wherein the human comprises a $50^{th}$ percentile male.

7. The method of claim 4, wherein the plurality of linear and angular acceleration values are generated by a six degrees of freedom (6DoF) sensor package located near the center of gravity.

8. The method of claim 7, wherein the 6DoF sensor package comprises three accelerometers and a triaxial angular rate sensor.

9. The method of claim 1, wherein determining the plurality of injury risk values further comprises performing a logistic regression analysis as a function of the plurality of linear and angular acceleration values.

10. The method of claim 1, wherein the first velocity is approximately 5.0 meters per second (m/s) and the second velocity is approximately 6.3 m/s.

11. The method of claim 1, wherein each of the first and the second impact configurations are applied using a pendulum impactor.

12. The method of claim 11, wherein the pendulum impactor comprises an arm, a pivot point, and an impactor surface.

13. The method of claim 12, wherein the impactor surface is flat.

14. The method of claim 1, wherein determining the overall injury risk metric further comprises:
multiplying a respective injury risk value for each of the first, the second, the third, the fourth, the fifth, and the sixth pair of single impacts of each of the first and the second impact configurations by a respective exposure value corresponding to a respective impact location of each of the first, the second, the third, the fourth, the fifth, and the sixth pair of single impacts of each of the first and the second impact configurations, to determine a plurality of weighted injury risk values; and
aggregating the plurality of weighted injury risk values, to determine the overall injury risk metric.

15. The method of claim 14, further comprising:
categorizing the overall injury risk metric into a rating system, the rating system comprising a numerical range.

16. The method of claim 1, wherein each of the helmet, the second helmet, the third helmet, and the fourth helmet is an equestrian helmet.

17. A method of evaluating a helmet, comprising:
applying a first impact configuration to the helmet and a second helmet that is a same model as the helmet, the first impact configuration comprising a first pair of single impacts applied separately to a front of each of the helmet and the second helmet, a second pair of single impacts applied separately to a side of each of the helmet and the second helmet, and a third pair of single impacts applied separately to a rear of each of the helmet and the second helmet;
applying a second impact configuration to a third helmet and a fourth helmet that are each the same model as the helmet, the second impact configuration comprising a fourth pair of single impacts applied separately to a front of each of the third helmet and the fourth helmet, a fifth pair of single impacts applied separately to a side of each of the third helmet and the fourth helmet, and a sixth pair of single impacts applied separately to a rear of each of the third helmet and the fourth helmet;

determining a plurality of injury risk values associated with the first and the second impact configurations, the plurality of injury risk values comprising an injury risk value for each of the first, the second, the third, the fourth, the fifth, and the sixth pair of single impacts of each of the first and the second impact configurations, wherein the injury risk value is determined based on an averaged linear acceleration value and an averaged angular acceleration value calculated for each of the first, the second, the third, the fourth, the fifth, and the sixth pair of single impacts of each of the first and the second impact configurations; and determining an overall injury risk metric for the helmet based on the plurality of injury risk values and a plurality of exposure values associated with the first and the second impact configurations.

18. The method of claim 17, further comprising:

determining the plurality of exposure values associated with the first and the second impact configurations, the plurality of exposure values comprising an exposure value for each of the front, the side, and the rear of the helmet, wherein the exposure value comprises a whole number denoting a relative frequency of impact that could respectively occur at the front, the side, and the rear of the helmet.

19. The method of claim 18, wherein each of the front, the side, and the rear of the helmet corresponds to a different exposure value.

20. The method of claim 17, wherein the first, the third, and the fifth pair of single impacts are each applied at a first velocity, and wherein the second, the fourth, and the sixth pair of single impacts are each applied at a second velocity.

* * * * *